United States Patent [19]

Zhou et al.

[11] Patent Number: 5,414,724
[45] Date of Patent: May 9, 1995

[54] MONOLITHIC SELF Q-SWITCHED LASER

[75] Inventors: Shouhuan Zhou, Beijing, China; Ying-chih Chen; Kotik K. Lee, both of Scarsdale, N.Y.; Youxi Gui, Beijing, China

[73] Assignees: North China Research Institute of Electro-Optics, Beijing, China; Quantum Electronics Technology, Inc., Hartsdale, N.Y.

[21] Appl. No.: 183,735

[22] Filed: Jan. 19, 1994

[51] Int. Cl.[6] .................................. H01S 3/11
[52] U.S. Cl. ........................... 372/10; 372/6; 372/11; 372/39; 372/68; 372/71
[58] Field of Search ............ 372/21, 22, 92, 69-71, 372/75, 68, 39, 41

[56] References Cited

U.S. PATENT DOCUMENTS

| | | | |
|---|---|---|---|
| 3,659,221 | 4/1972 | Melamed et al. | 372/68 |
| 3,931,590 | 1/1976 | Greenberg | 331/94.5 E |
| 3,931,591 | 1/1976 | Greenberg | 331/94.5 E |
| 4,479,220 | 10/1984 | Bor et al. | 372/25 |
| 4,731,787 | 3/1988 | Fan et al. | 372/71 |
| 4,739,507 | 4/1988 | Byer et al. | 372/71 |
| 4,761,786 | 8/1988 | Baer | 372/10 |
| 4,764,933 | 8/1988 | Kozlowsky et al. | 372/75 |
| 4,879,723 | 11/1989 | Dixon et al. | 372/75 |
| 4,942,582 | 7/1990 | Kintz et al. | 372/41 |
| 5,027,361 | 6/1991 | Kozlovsky et al. | 372/22 |
| 5,038,352 | 8/1991 | Lenth et al. | 372/21 |
| 5,043,996 | 8/1991 | Nilsson et al. | 372/94 |
| 5,062,117 | 10/1991 | Anthon et al. | 372/75 |
| 5,070,505 | 12/1991 | Dixon | 372/22 |
| 5,084,879 | 1/1992 | Suzuki et al. | 372/22 |
| 5,117,437 | 5/1992 | Rand | 372/41 |
| 5,119,382 | 6/1992 | Kennedy et al. | 372/11 |
| 5,130,996 | 7/1992 | Amano et al. | 372/41 |
| 5,193,096 | 3/1993 | Amano | 372/70 |
| 5,197,072 | 3/1993 | Harada et al. | 372/22 |
| 5,200,966 | 4/1993 | Esterowitz et al. | 372/71 |
| 5,200,972 | 4/1993 | Scheps | 372/41 |
| 5,222,088 | 6/1993 | Amano | 372/22 |
| 5,245,623 | 9/1993 | McFarlane | 372/41 |
| 5,287,373 | 3/1994 | Rapoport et al. | 372/41 |

OTHER PUBLICATIONS

Compact GSGG:$Cr^{3+}$:$Nd^{3+}$ Laser With Passive Q Switching, A. A. Danilov, et al., Sov. J. Quantum Electron, 17 (5), May 1987, pp. 573–574.

*Primary Examiner*—Léon Scott, Jr.
*Attorney, Agent, or Firm*—Perman & Green

[57] ABSTRACT

A monolithic self-Q-switched laser generates laser pulses with short duration, high peak power, a single longitudinal mode, and extremely small pulse-to-pulse intensity fluctuations. The laser comprises of a length of solid-state laser material with a plurality of dopants, so that the material can generate coherent radiation for laser action and, in the same material, provide saturable absorption at the wavelength of the laser emission necessary for Q-switching. The distributed saturable absorber in the material provides a spectral stabilization mechanism that ensures single longitudinal-mode operation. The laser cavity is formed by the two end surfaces of the solid-state laser material with appropriate reflectivity coatings. When the laser material is pumped above the threshold condition, the laser device produces short pulses having high peak power in a single longitudinal mode and single transverse mode.

10 Claims, 2 Drawing Sheets

MONOLITHIC SELF Q-SWITCHED LASER

FIELD OF THE INVENTION

This invention relates to self Q-switched solid-state lasers and more particularly, to such a laser wherein functions of the gain medium and saturable absorber are combined into one in a monolithic cavity of solid-state laser material.

BACKGROUND OF THE INVENTION

In numerous applications, it is desirable to have laser pulses with some or all of the following features: high-peak power, short pulse duration, small pulse-to-pulse intensity fluctuation and shape variation, stable single transverse mode, single longitudinal mode without pulse-to-pulse mode competition, and a polarized output. Q-switching is a commonly used technique for generating short laser pulses with high peak power. The function of Q-switching is to prevent lasing in a laser oscillator by spoiling the Q-value of the cavity through introduction of high losses while the gain medium is being pumped and, when sufficient energy is stored in the medium, to abruptly restore the Q-value by reducing the cavity loss so that stored energy is released in a single giant pulse.

Depending on the method used to control the cavity Q-value, there are two types of Q-switching, i.e. active or passive Q-switching. Active Q-switching requires an electrical or electronic control element e.g. a rotating mirror, an acousto-optic modulator, or an electro-optic modulator. Passive Q-switching relies on the laser pulse itself to control the cavity's Q-value. Typically, saturable absorbing materials such as organic dyes, color centers, or semiconductor materials are inserted into the cavity for inducing Q-switching. These materials have higher absorbance when the laser intensity is low and smaller absorbance when the laser intensity is high. Thus the saturable absorber tends to promote pulsed operation by enhancing the peaks and suppressing the leading and trailing edges of the pulses. Since passive-Q-switching does not require an external control element, it is simpler to use.

U.S. Pat. 5,119,382 to Kennedy et al. show a passive Q-Switched laser system wherein the Q-switch is housed externally to the laser structure. Passive Q-switching can be further simplified if the gain medium includes saturable absorbers so that Q-switching can take place without external control. Self Q-switching in solid-state lasers is described by the article entitled "Compact GSGG;Cr:Nd laser with passive Q-switching" by A. A. Danilov, et al , Soviet Journal of Quantum Electronics Volume 17(5), pages 573–574. The article discloses a flashlamp-pumped laser made of a gadolinium, scandium, gallium, garnet crystal (GSGG), doped with trivalent chromium, and neodymium.

The Danilov et al. self Q-switched laser has the advantage of simplicity and compactness, but it is still a conventional flashlamp pumped laser with external mirrors and thus is not immune to the common problems of Q-switched lasers such as intensity fluctuation, thermally-induced depolarization, and multi-longitudinal modes. Danilov et al. do not appear to have investigated the effects of a saturable absorber on lasing characteristics, such as frequency and polarization. In particular, the possibility of achieving longitudinal mode stabilization utilizing distributed saturable absorbers is not discussed. It has been found by the Inventors hereof that longitudinal mode stabilization is effective only when certain specific conditions are satisfied.

Single-longitudinal-mode operation is the most difficult to achieve. In a homogeneously broadened solid-state laser, single longitudinal mode operation is often spoiled by spatial hole burning (i.e. plural modes emerging from disparate locations with respect to the laser's transmitting axis). In a conventional Q-switched solid-state laser, a number of longitudinal modes operate simultaneously, and beating among these longitudinal modes results in a spiky pattern superimposed on the temporal envelope of the pulses.

To maintain a single longitudinal mode, it is necessary to eliminate spatial hole burning, for example, by using a ring cavity. One prior art method for eliminating spatial hole burning in a standing-wave resonator involves the use of an additional wavelength selective element, such as an etalon. However, the use of etalon both adds to the complexity of the laser device and still does not completely eliminate the pulse-to-pulse hopping, especially when the laser is subject to vibrations.

Another prior art method for ensuring single longitudinal mode operation is the use of a very short laser cavity, referred to as microchip cavity. Typically, single longitudinal-mode operation can be obtained if the free spectral range of the cavity is larger than the bandwidth of the gain spectrum. For example, in order to obtain a single longitudinal mode in a neodymium-doped, yttrium, aluminum, garnet (Nd:YAG) laser with 180 GHz bandwidth, the laser cavity must be less than 0.7 mm. Such a short cavity has the drawback of having small pulse energy due to the small gain volume.

It is an object of this invention to provide a simple self Q-switched laser which can generate a single longitudinal mode without pulse-to-pulse mode competition, and can also provide both intensity and pulse shape stability.

It is a further object of this invention to provide a self Q-switched laser that is monolithic in structure.

SUMMARY OF THE INVENTION

This invention provides a monolithic Q-switched laser capable of providing short laser pulses in a single longitudinal mode, single transverse mode, and with high-peak-power. The laser monolithic cavity is preferably a block of solid-state laser material with a plurality of dopants for both generating coherent radiation and creating saturable absorption at the wavelength of the coherent radiation. Such material is selected from any of a variety of solid-state laser host materials such as YAG, GSAG, GSGG. An exemplary material is Cr and Nd codoped YAG in which Nd is the ingredient responsible for emitting coherent radiation and Cr is the ingredient responsible for saturable absorption. The term "saturable absorption" refers to the property that the absorbance decreases as the light intensity increases.

The monolithic material is polished to form a laser cavity: a first end surface is coated with a reflective coating and a second end surface is coated to be partially reflecting and to be partially transmitting of coherent radiation. The two end mirrors may have any of a variety of curvatures, including planar, concave, and convex. The cavity defines the spatial distribution of the lasing modes.

The pump source used for exciting the lasing medium may be a single diode laser or a diode laser array. The pump may enter the gain medium either from one end surface, i.e., "end pumping", or from the side of the monolithic cavity, ie., "side pumping" Upon being absorbed, population inversion is established in the gain medium.

The standing waves of the lasing mode at a given frequency bleaches the saturable absorber and establishes a periodic low-loss region whose periodicity is equal to one-half of the wavelength. This self-induced low-loss "grating" provides a frequency-selection mechanism that enhances the existing lasing mode and suppresses modes at other frequencies. In a monolithic cavity wherein the saturable absorber fills the entire cavity, frequency selection is effective and single frequency can be ensured.

Although conventional Nd:YAG lasers have no preferred polarization direction and must rely on external polarizing optics to define the direction of polarization, in this invention, the saturable absorber creates an anisotropic absorption characteristic that forces the laser output to be linearly polarized.

Laser pulse duration is controlled by the length of the cavity and the ratio of the initial and final population inversions. The pulse duration typically decreases with decreasing cavity length and an increasing ratio of the initial and final population inversions.

Self Q-switched lasers incorporating the principles of this invention have produced short pulses of high peak power with pulse duration ranging from 50 ps to 500 ns, and a single transverse mode, single longitudinal mode, polarized output, and with an intensity fluctuation of less than 0.1%, without pulse-to-pulse mode competition.

DESCRIPTION OF PREFERRED EMBODIMENTS

Figure 1:
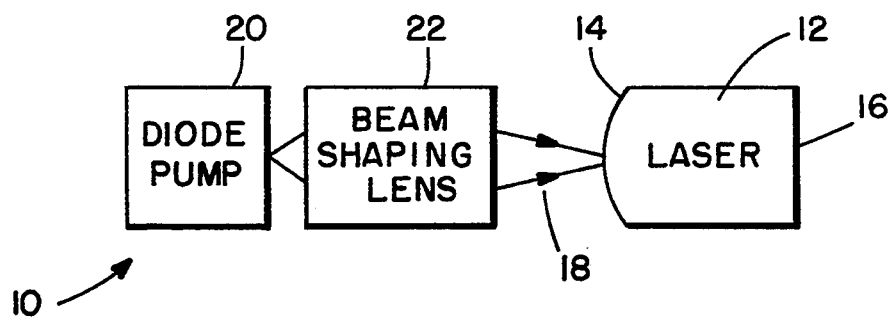
FIG. 1 schematically illustrates a monolithic self Q-switched laser, with end pumping constructed in accordance with the invention.

Referring to FIG. 1, there is shown a schematic of a monolithic self Q-switched laser device 10. While the cavity structure may have varied physical dimensions and may be comprised of various materials (as is well known to those skilled in the art), a (Cr,Nd):YAG self Q-switched laser with planar-concave cavity will be described for exemplary purposes.

The medium of the laser cavity 12 is comprised of a YAG crystal codoped with Nd and Cr. The concentration of Nd is about 1 atomic %,. Suitable Cr concentration ranges are from about 0.01 to about 0.5 atomic %. While higher or lower dopant concentrations for Cr may be selected so as to be appropriate for a particular application, the concentration must be high enough to cause self Q-switching when conditions for laser oscillation are satisfied. It will be understood by those skilled in the art that it is preferred to add the aforesaid dopants in oxide form, i.e., $Cr_2O_3$, MgO, CaO, etc.

Laser cavity 12 is further defined by reflecting end mirrors 14 and 16 that are directly deposited thereon. Reflecting mirror 14 may be totally reflective at the laser wavelength and highly transmissive at the wavelength of pumping laser beam 18. Mirror 14 is concave (from the cavity point of view) and has a radius of curvature of 8 cm. End mirror 16 is partially reflective to the laser radiation at 1064 nm so as to serve as an output coupler. The cavity length is 6 mm.

Figure 2:
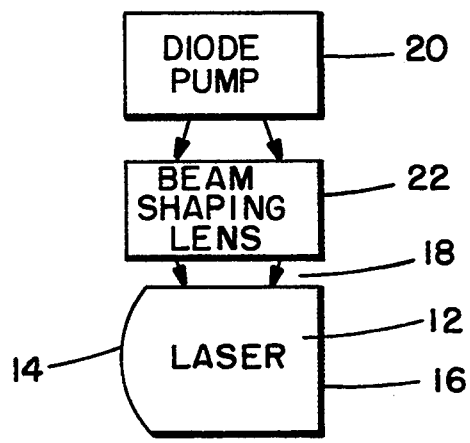
FIG. 2 schematically illustrates the monolithic self-Q-switched laser of FIG. 1, with side pumping.

Laser cavity 12 is pumped by laser beam 18 which is, in turn, produced by a diode laser pump 20 to achieve a sufficient population inversion to support lasing. The pump beam can enter the gain medium through one end of the cavity as shown in FIG. 1, or through the side of the cavity as shown in FIG. 2. For best effect, it is preferable to arrange a focusing and beam shaping lens 22 so as to maintain a uniform cross section of the pumped region throughout cavity 12, from mirror 14 to mirror 16. Diode pump 20 may be a single diode laser or plural diode laser arrays, depending on the energy requirements for a given application. Focusing and beam shaping lens 22 may be eliminated and the pump beam 18 may enter the cavity without any focusing or beam shaping.

While spatial hole burning in laser cavity 12 tends to promote multi-longitudinal-mode operation, in the present invention, the same hole-burning effect when combined with distributed saturable absorbers in laser cavity 12, results in stabilization of single-longitudinal mode operation. This is because the lasing mode bleaches a loss grating created by the saturable absorbers in laser cavity 12 and creates a low-loss window to enhance itself. For illustration purposes, a monolithic laser cavity 12 with a uniformly distributed saturable absorber (i.e. dopant) is considered. The power density of the standing waves set up by laser action in laser cavity 12 has a sinusoidal spatial distribution given by:

$$P(\lambda, z) = P_0 \sin^2 (2\pi n z/\lambda) \quad (1)$$

where: $P_0$ is the amplitude of the standing waves, $\lambda$ is the wavelength of the longitudinal mode, and n is the refractive index. The spatial distribution of the absorption coefficient along the cavity axis, as established by the standing waves at wavelength $\lambda$ can be expressed as:

$$\alpha(\lambda, z) = \alpha_0/(1 + P(\lambda, z)/P_{sat}) \quad (2)$$

where: $\alpha_0$ is the unsaturated absorption coefficient and $P_{sat}$ is the saturation power density. The periodical distribution of absorption coefficient along the axis of the cavity produces a low-loss grating whose loss is minimum at $\lambda_0$. In the presence of a dominant lasing mode of wavelength $\lambda_0$, the effective absorption coefficient of the axial mode at wavelength $\lambda$ can be calculated by:

$$\alpha(\lambda) = \int \alpha(\lambda_0, z) P(\lambda, z) dz / \int P(\lambda, z) dz \quad (3)$$

Figure 3:
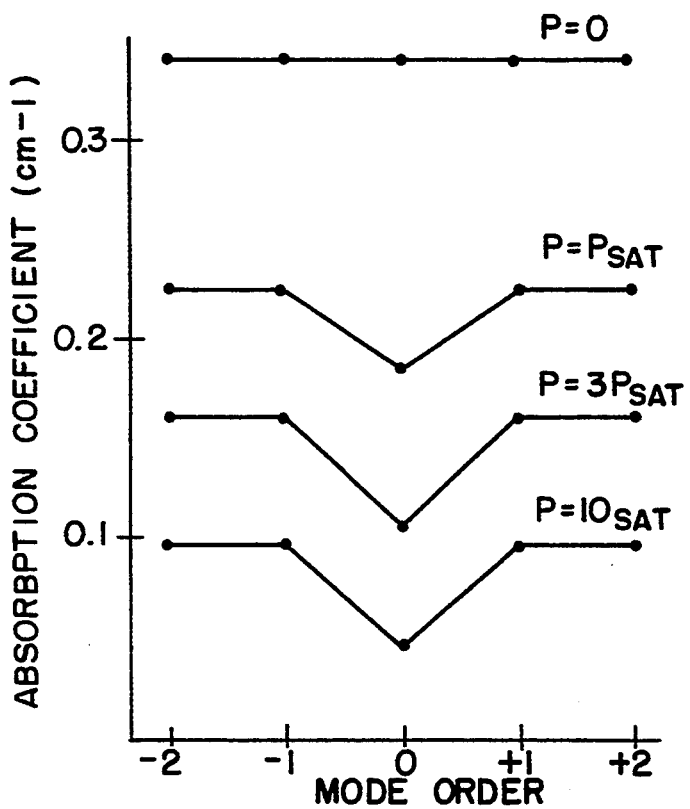
FIG. 3 illustrates calculated modal loss of longitudinal modes in the presence of a lasing mode at various power densities.

The calculated absorption coefficients for the axial modes of various orders in the presence of a center mode, defined as order 0, at various power densities are plotted in FIG. 3. The lasing mode establishes a narrow low-loss window that suppresses the adjacent modes.

For a low-loss grating of length $L_g$, the spectral width of the low-loss window is given by $c/2L_g$ where c is the speed of light. In order to ensure total suppression of adjacent longitudinal modes, the spectral width of the low-loss window must be smaller than c/2L, the frequency separation between adjacent longitudinal modes. Thus, the condition for single-longitudinal mode operation is $c/L_g \leq c/2L$ or $L_g \geq L$. This condition is always satisfied in a monolithic cavity in which the length of the saturable absorber is equal to the length of the cavity.

Typically, in a conventional solid-state laser, single-longitudinal mode operation can be obtained if the frequency separation $c/2L$ is larger than the bandwidth of the gain spectrum. In Nd:YAG whose gain bandwidth is 180 GHz, a single longitudinal mode can be obtained if the cavity length L is smaller than 0.7 mm. In a monolithic cavity with a distributed saturable absorber constructed in accordance with the invention, the spectral width of the low-loss window is always equal to the free spectral range of the cavity. This effectively removes the restriction on the maximum cavity length for single-longitudinal-mode operation. Single-longitudinal-mode has been observed for cavities as long as 10 cm.

Figure 4:
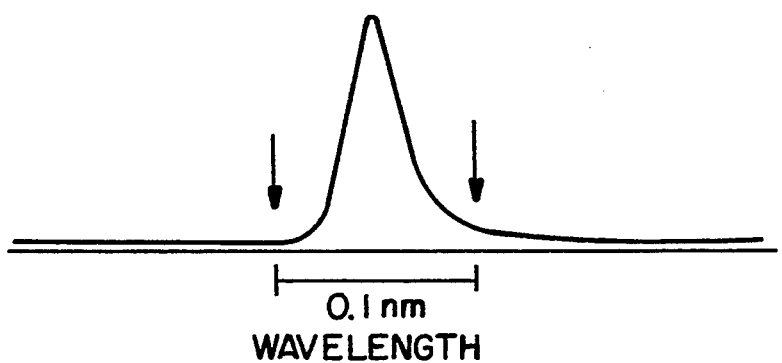
FIG. 4 illustrates the spectrum of the lasing mode of laser device with 5-mm cavity length.

FIG. 4 shows the lasing spectrum of Q-switched pulses measured by using a grating spectrometer. The arrows show the positions of adjacent longitudinal modes. The laser stably operates in a single longitudinal mode without pulse-to-pulse mode competition. In contrast, a regular monolithic Nd:YAG laser with 5-mm cavity length operates in single mode only for powers less than 1.2 mW.

The monolithic cavity also eliminates the pulse-to-pulse intensity fluctuation commonly found in self Q-switched lasers. The observed intensity fluctuation is less than 0.1%.

Typically, the output of a conventional Nd:YAG laser is unpolarized because the crystal is isotropic to the emission of $Nd^{3+}$. To obtain a polarized output in such a laser, it is necessary to use intracavity polarizing optics such as a polarizer or a Brewster window. In the present invention, the added dopants introduce anisotropy in the absorption characteristics and provides a means for defining polarization. The electric field is polarized along the direction that has the lowest saturation power. Thus, a linearly polarized output with an extinction ratio of 700:1 is obtained without any polarizing optics.

Figure 5:
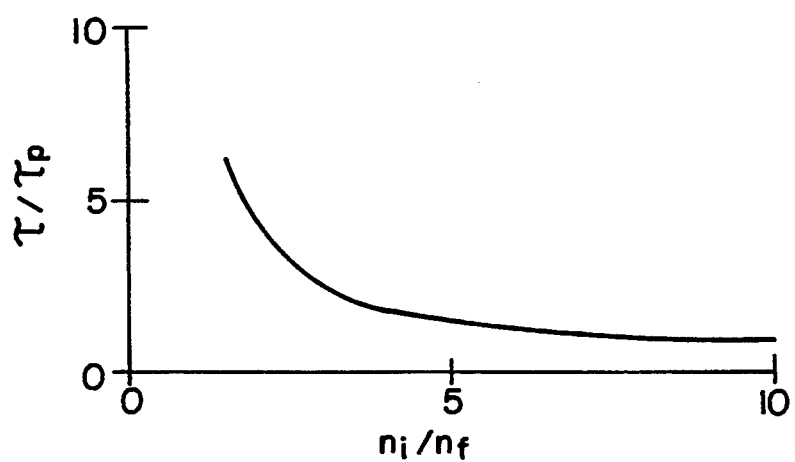
FIG. 5 illustrates the pulse duration, in multiples of the photon lifetime, as a function of ratio of the initial inversion and final inversion.

The pulse duration of a monolithic Q-switched laser constructed in accordance with the invention is determined by the photon lifetime and the ratio $n_i/n_f$, where $n_i$ is the population inversion before the saturation and $n_f$ is the population inversion after the saturation. For a monolithic laser device with a saturable absorption coefficient $\alpha_s$, unsaturable absorption coefficient $\alpha_u$, length L, and mirror reflectivity $R_1$ and $R_2$, $n_i$ is proportional to $\alpha_s + \alpha_u + \frac{1}{2}L \ln(1/R)$ and $n_f$ is proportional to $\alpha_u + \frac{1}{2}L \ln(1/R_1 R_2)$, and $\tau_p$ is given by $c\alpha_u/n + c/2nL \ln(1/R_1 R_2)$ where c is the speed of light and n is the refractive index of the laser material. The numerically calculated pulse duration, in multiples of $\tau_p$, as a function of $n_i/n_f$, is shown in FIG. 5. Using the parameters of a monolithic (Nd,Cr):YAG laser as an example, L=0.5 cm, $R_1 = 1$, $R_2 = 0.95$, $\alpha_s = 0.26$ cm$^{-1}$, $\alpha_u = 0.06$ cm$^{-1}$, n=1.8 the ratio $n_i/n_f = 3.36$ and $\tau_p = 0.6$ ns. From FIG. 5, the pulse duration is 2.3 times $\tau_p$ or 1.3 ns.

The pulse duration can be further shortened if a shorter cavity and/or higher concentration of a saturable absorber are chosen. For example, if L=1 mm, $R_1 = 1$, $R_2 = 0.9$, n=1.8, $\alpha_s = 2$ cm$^{-1}$, $\alpha_u = 0.4$ cm$^{-1}$, then $n_i/n_f = 3.15$, $\tau_p = 65$ ps, the pulse duration is 2.3 times $\tau_p$ or 150 ps.

Although there has been illustrated and described specific detail and structure of the invention, it is to be understood that they were merely for purposes of illustration and that changes can be readily made therein by those skilled in the art without departing from the scope and spirit of this invention. For instance, while laser cavity 12 has been desorbed a "block" it can also take the form of a length of optical fiber that has been appropriately doped.

What is claimed is:

1. A self Q-switched solid-state laser, comprising:
   a length of solid-state laser host material, containing at least a first dopant element to enable said host material to emit coherent radiation and at least a second dopant element which is a different species from said first dopant element and provides saturable absorption within said host material at the wavelength of said coherent radiation, said saturable absorption having a property of high absorbance at low intensity levels of coherent radiation and low absorbance at high intensity levels of coherent radiation, a first end surface of said length polished and coated with a reflecting coating to form a first end of a laser cavity, a second end surface of said length polished and coated with a reflecting coating that partially reflects coherent radiation within said length and partially transmits said coherent radiation; and
   a pumping source coupled to said solid state laser for providing pump radiation which induces a population inversion of said first dopant element to produce coherent radiation in said solid state laser, said pump radiation having sufficient energy to induce coherent radiation in said host material, said coherent radiation saturating said second dopant species and reducing absorbance therein which further enhances said coherent radiation to an enhanced high intensity level, said coherent radiation extinguishing upon depletion of the population inversion.

2. A self Q-switched solid-state laser device as recited in claim 1, wherein said length of laser host material is selected from the group consisting of YAG, GSGG, GSAG, and glass.

3. A self Q-switched solid-state laser device as recited in claim 1, wherein said first dopant element is Nd.

4. A self Q-switched solid-state laser device as recited in claim 1, wherein said first dopant element is Nd and said second dopant element is selected from the group consisting: Cr, Ca, Mg, Sr, Ba.

5. A self Q-switched solid state laser as recited in claim 1, wherein said host material includes both said second dopant element and additional elements, said second and additional elements selected from a group consisting of: (Cr, Ca), (Cr,Ca,Mg), (Cr, Mg), (Ca,Mg), (Cr, Sr), and (Cr,Ba).

6. A self-Q-switched solid-state laser device as recited in claim 1 wherein said reflecting coating on the first end surface has a high reflectivity at a wavelength of said coherent radiation and low reflectivity at a wavelength of pump radiation.

7. A self-Q-switched solid-state laser device as recited in claim 1 wherein said second dopant element causes said host material to exhibit a saturable absorption that is anisotropic, thereby providing means for defining a polarization for said coherent radiation.

8. A self-Q-switched solid-state laser device as recited in claim 1 further comprising:

means for collecting said pump radiation emitted from said pumping source and for directing it into one said end surface.

9. A self-Q-switched solid-state laser device as recited in claim 1 further comprising:
means for collecting said pumping radiation emitted from said pumping source and for directing it into a side of the said length of solid-state laser host material.

10. A self Q-switched solid-state laser device as recited in claim 1 as recited in claim 1 wherein said length of solid state laser host material is configured from an optical fiber.

* * * * *